(12) United States Patent
Chen

(10) Patent No.: US 7,453,692 B2
(45) Date of Patent: Nov. 18, 2008

(54) COMPUTER DEVICE WITH A MODULAR TRANSMISSION INTERFACE, THE MODULAR TRANSMISSION INTERFACE, AND AN ADAPTOR BOARD

(75) Inventor: Yuang-Chih Chen, Taipei Hsien (TW)

(73) Assignee: Aopen Inc., Taipei Hsien (TW)

( * ) Notice: Subject to any disclaimer, the term of this patent is extended or adjusted under 35 U.S.C. 154(b) by 188 days.

(21) Appl. No.: 11/591,169

(22) Filed: Oct. 31, 2006

(65) Prior Publication Data

US 2007/0230108 A1 Oct. 4, 2007

(30) Foreign Application Priority Data

Apr. 3, 2006 (TW) ............... 95205582 U

(51) Int. Cl.
*G06F 1/16* (2006.01)
(52) U.S. Cl. .............. 361/685; 369/47.35; 710/302; 463/32
(58) Field of Classification Search ............... 463/30, 463/32, 37; 345/158, 169, 660, 669; 710/15, 710/74, 100, 302; 312/223.2; 369/1, 44.11, 369/47.35, 53.3; 361/679–687, 724–727
See application file for complete search history.

(56) References Cited

U.S. PATENT DOCUMENTS 5,917,795 A * 6/1999 Furukawa et al. ........... 720/635
7,346,915 B2 * 3/2008 Te et al. ..................... 720/664
2003/0188203 A1 10/2003 Park .......................... 713/300
2006/0018086 A1 1/2006 Liu .......................... 361/679
2006/0291784 A1 * 12/2006 Wang et al. ................. 385/92

FOREIGN PATENT DOCUMENTS

JP 08-076890 3/1996

OTHER PUBLICATIONS

European Search Report EP06 25 5988.

* cited by examiner

*Primary Examiner*—Hung V Duong
(74) *Attorney, Agent, or Firm*—Frommer Lawrence & Haug LLP; Ronald R. Santucci

(57) ABSTRACT

A modular transmission interface is provided on a motherboard. The motherboard has a South Bridge and a power transmission port. The transmission interface includes a slot connector and an adaptor board. The slot connector is provided on the motherboard, and is connected to the South Bridge and the power transmission port. The adaptor board has a board body, a mating connector provided on the board body and connected detachably to the slot connector, a hard disk connector provided on the board body and connected to the mating connector, and an optical disk drive connector provided on the board body and connected to the mating connector. A hard disk and an optical disk drive can be connected to the motherboard through the adaptor board, thereby facilitating assembly and maintenance.

21 Claims, 9 Drawing Sheets

COMPUTER DEVICE WITH A MODULAR TRANSMISSION INTERFACE, THE MODULAR TRANSMISSION INTERFACE, AND AN ADAPTOR BOARD

CROSS-REFERENCE TO RELATED APPLICATION

This application claims priority of Taiwanese Application No. 095205582, filed on Apr. 3, 2006.

BACKGROUND OF THE INVENTION

1. Field of the Invention

The invention relates to a computer device, more particularly to a computer device having a modular transmission interface that facilitates assembly of a hard disk and an optical disk drive, and to a modular transmission interface and an adaptor board.

2. Description of the Related Art

Referring to FIG. 1, when installing a hard disk 10 in a conventional computer device, in addition to securing the hard disk 10 on a housing 11, the hard disk 10 is connected to a motherboard 13 through a flexible ribbon cable 12, and is connected to a power supply 15 through a transmission line 14. Similarly, a flexible ribbon cable 17 is also used to connect an optical disk drive 16 to the motherboard 13.

In recent years, there is a trend toward miniaturization of electronic equipment. To meet such trend, the size of computer devices, such as the computer device of a bare computer system, has become smaller and smaller. However, with a reduction in the size of the computer device, the assembly positions of components in the computer device become closer and closer. As a result, clearances among the components become smaller than ever. On the other hand, since the connection of the flexible ribbon cables 12, 17 requires a sufficient space, the installation of the hard disk 10 and the optical disk drive 16 is getting more and more difficult, thereby rendering assembly and maintenance of the hard disk 10 and the optical disk drive 16 inconvenient and difficult.

SUMMARY OF THE INVENTION

Use of an adaptor board that is connected detachably to a motherboard is contemplated for mounting of a hard disk connector and an optical disk drive connector thereon such that a hard disk and an optical disk drive can be directly connected to a mating connector of the adaptor board without using flexible ribbon cables so as to achieve a modular transmission interface to thereby facilitate assembly and maintenance.

Therefore, the object of the present invention is to provide a computer device having a modular transmission interface, the modular transmission interface, and an adaptor board that can facilitate assembly.

Accordingly, the modular transmission interface of the present invention is provided on a motherboard. The motherboard has a South Bridge and a power transmission port. The transmission interface includes a slot connector and an adaptor board. The slot connector is provided on the motherboard, and is connected to the South Bridge and the power transmission port. The adaptor board has a board body, a mating connector provided on the board body and connected detachably to the slot connector, a hard disk connector provided on the board body and connected to the mating connector, and an optical disk connector provided on the board body and connected to the mating connector.

With the arrangement of the adaptor board and the slot connector, the hard disk and the optical disk drive can be directly connected to the hard disk connector and the optical disk drive connector, respectively, so as to permit signal and power transmission with the motherboard, thereby facilitating assembly and maintenance.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
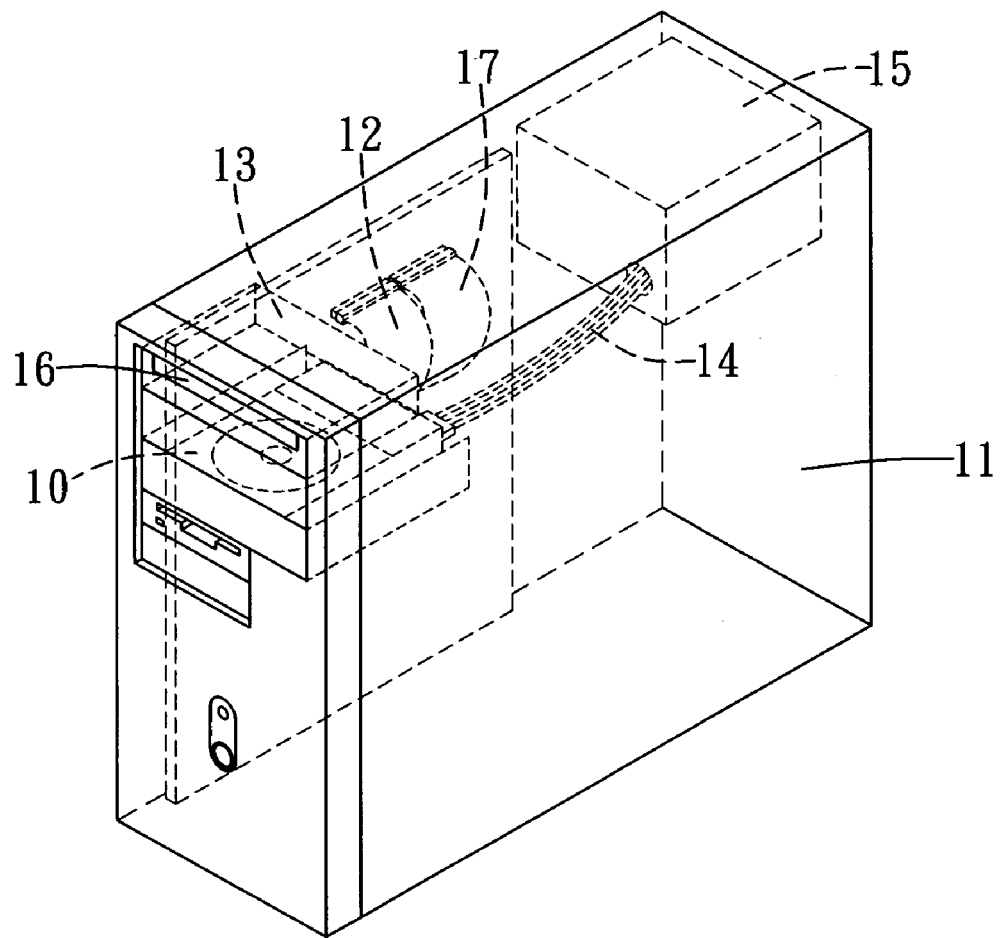
FIG. 1 is a schematic view to illustrate assembly of a hard disk and an optical disk drive in a conventional computer device.
Figure 2:
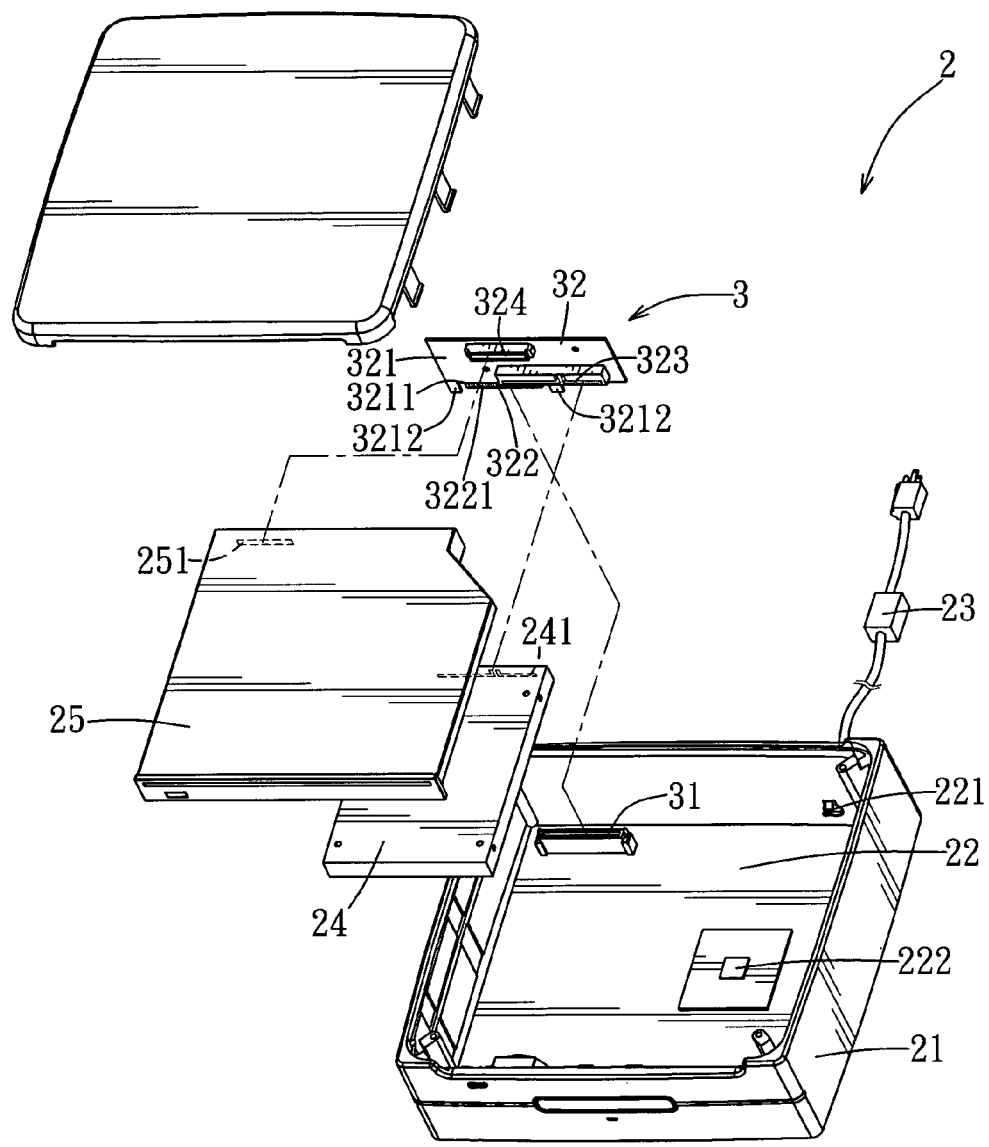
FIG. 2 is an exploded view of a preferred embodiment of a computer device having a modular transmission interface according to the present invention.

Referring to FIG. 2, the preferred embodiment of a computer device 2 having a modular transmission interface according to the present invention is shown to include a housing 21, a motherboard 22 disposed in the housing 21, a power supply 23, a hard disk 24, an optical disk drive 25, and a modular transmission interface 3. To reduce the size of the computer device 2 effectively, the power supply 23 in this embodiment is an external transformer that connects to a power transmission port 221 of the motherboard 22 so that external power can be delivered to each of the computer components through the motherboard 22. The motherboard 22 has a South Bridge 222 responsible for peripheral components, such as the hard disk 24 and the optical disk drive 25. Certainly, the computer device 2 may include other computer components, such as a North Bridge (not shown), a memory (not shown), and a microprocessor (not shown). As these components are well known in the art and are not the crux of this invention, they will not be discussed in detail herein.

The modular transmission interface 3 in this embodiment has a slot connector 31 provided on the motherboard 22, and an adaptor board 32.

Figure 3:
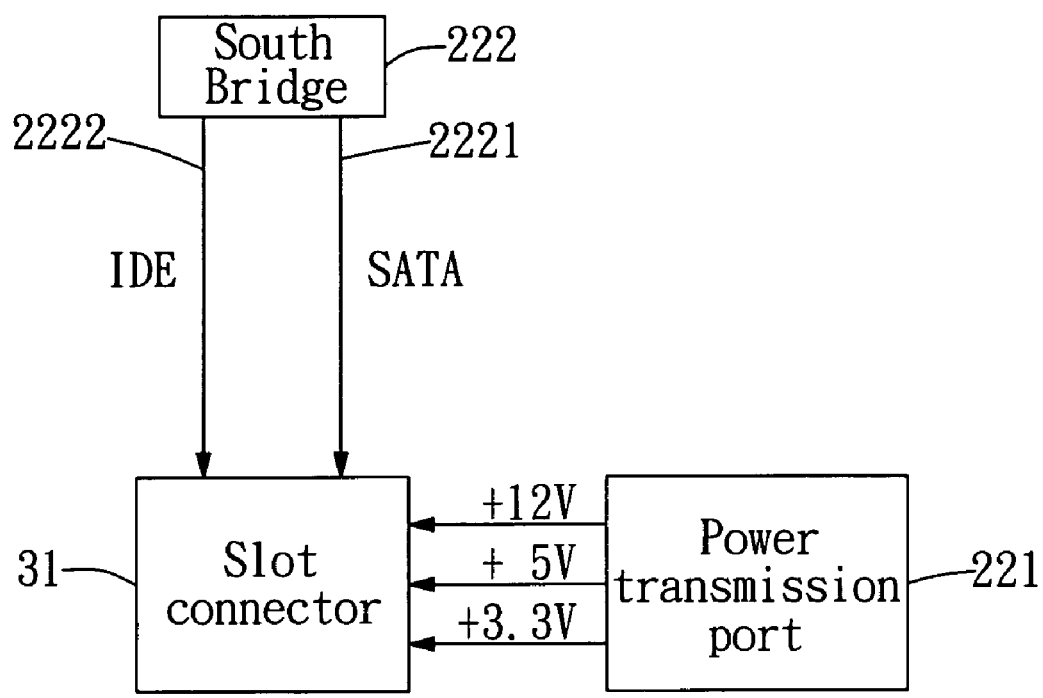
FIG. 3 is a block diagram to illustrate electrical connection between a slot connector and a motherboard of the preferred embodiment.
Figure 4:
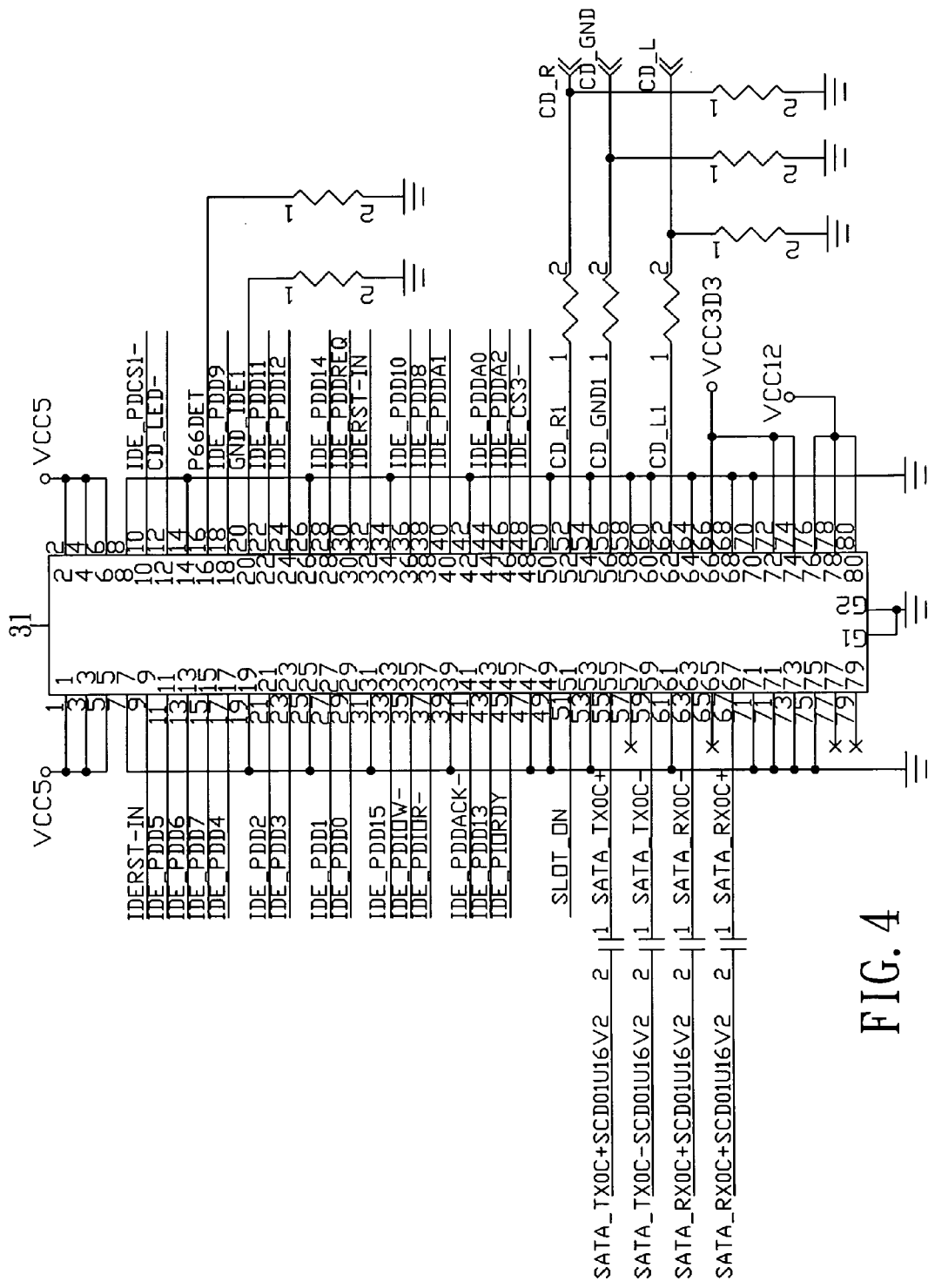
FIG. 4 is a layout diagram of an example of the slot connector of the preferred embodiment.

Referring to both FIGS. 2 and 3, to effectively reduce the space required for transmission wiring of the hard disk 24 and the optical disk drive 25, the slot connector 31 in this embodiment is connected to the South Bridge 222 and the power transmission port 221. In particular, the slot connector 31 is connected to two transmission lines 2221, 2222 of the South Bridge 222 which are used for the hard disk 24 and the optical disk drive 25, respectively, such that the South Bridge 222 can control the hard disk 24 and the optical disk drive 25 through a single slot connector 31. Besides, the power supplied via the power transmission port 221 can be delivered to the hard disk 24 and the optical disk drive 25 through the slot connector 31 so as to supply the hard disk 24 and the optical disk drive 25 with the electric power necessary for operation. The transmission interfaces of the South Bridge 222 which are associated with the hard disk 24 and the optical disk drive 25 include a Serial Advanced Technology Attachment (SATA) interface and an Integrated Drive Electronics (IDE) interface, the latter being also known as a Parallel Advanced Technology Attachment (PATA) interface. At present, the transmission interface for a hard disk includes SATA and IDE, whereas the transmission interface for an optical disk drive is largely IDE. Referring to FIG. 4, the slot connector 31 in this embodiment integrates SATA and IDE. Certainly, it is apparent to those skilled in the art that the slot connector 31 may be one integrating two IDE interfaces, and is not limited to the disclosure of the preferred embodiment.

Figure 5:
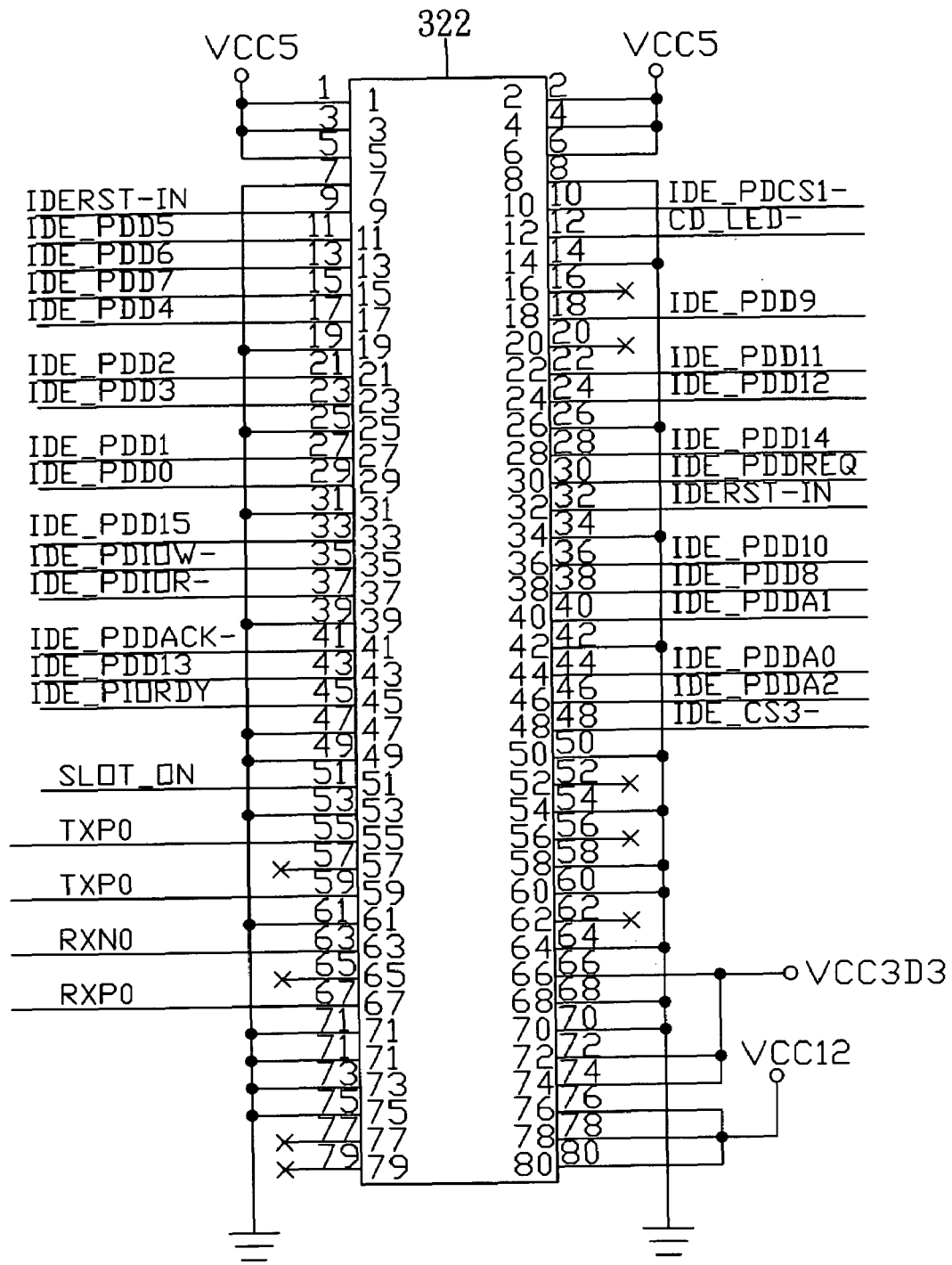
FIG. 5 is a layout diagram of an example of a mating connector of the preferred embodiment.

Referring to FIG. 2, the adaptor board 32 includes a board body 321, a mating connector 322 provided on the board body 321 and connected detachably to the slot connector 31, a hard disk connector 323 provided on the board body 321 and connected to the mating connector 322, and an optical disk drive connector 324 provided on the board body 321 and connected to the mating connector 322. The board body 321 in this embodiment is a substantially rectangular printed circuit board (PCB). To reduce the space required for assembling the mating connector 322 and the slot connector 31, a tab 3211 in the form of a strip extends downwardly from a bottom side of the board body 321 at a position corresponding to the slot connector 31. The length of the tab 3211 is dimensioned to match that of the slot connector 31 so as to be insertable into the slot connector 31. The mating connector 322 has a plurality of conductive pieces 3221 that are arranged in a row on a surface of the tab 3211. The mating connector 322 in this embodiment is the so-called golden finger connector. As shown in FIG. 5, the arrangement of the conductive pieces 3221 of the mating connector 322 corresponds to the slot connector 31.

Figure 6:
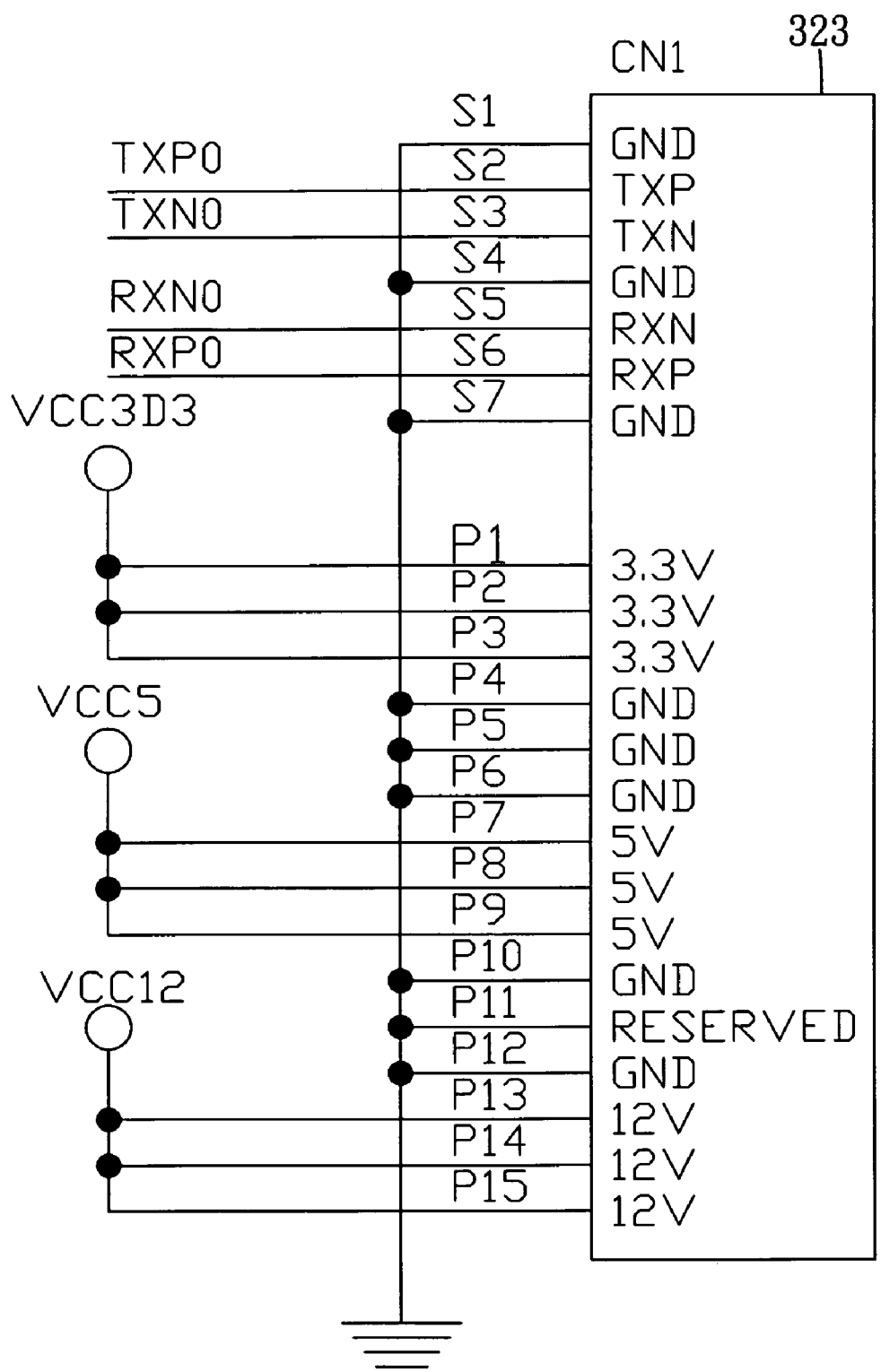
FIG. 6 is a layout diagram of an example of a hard disk connector of the preferred embodiment.
Figure 7:
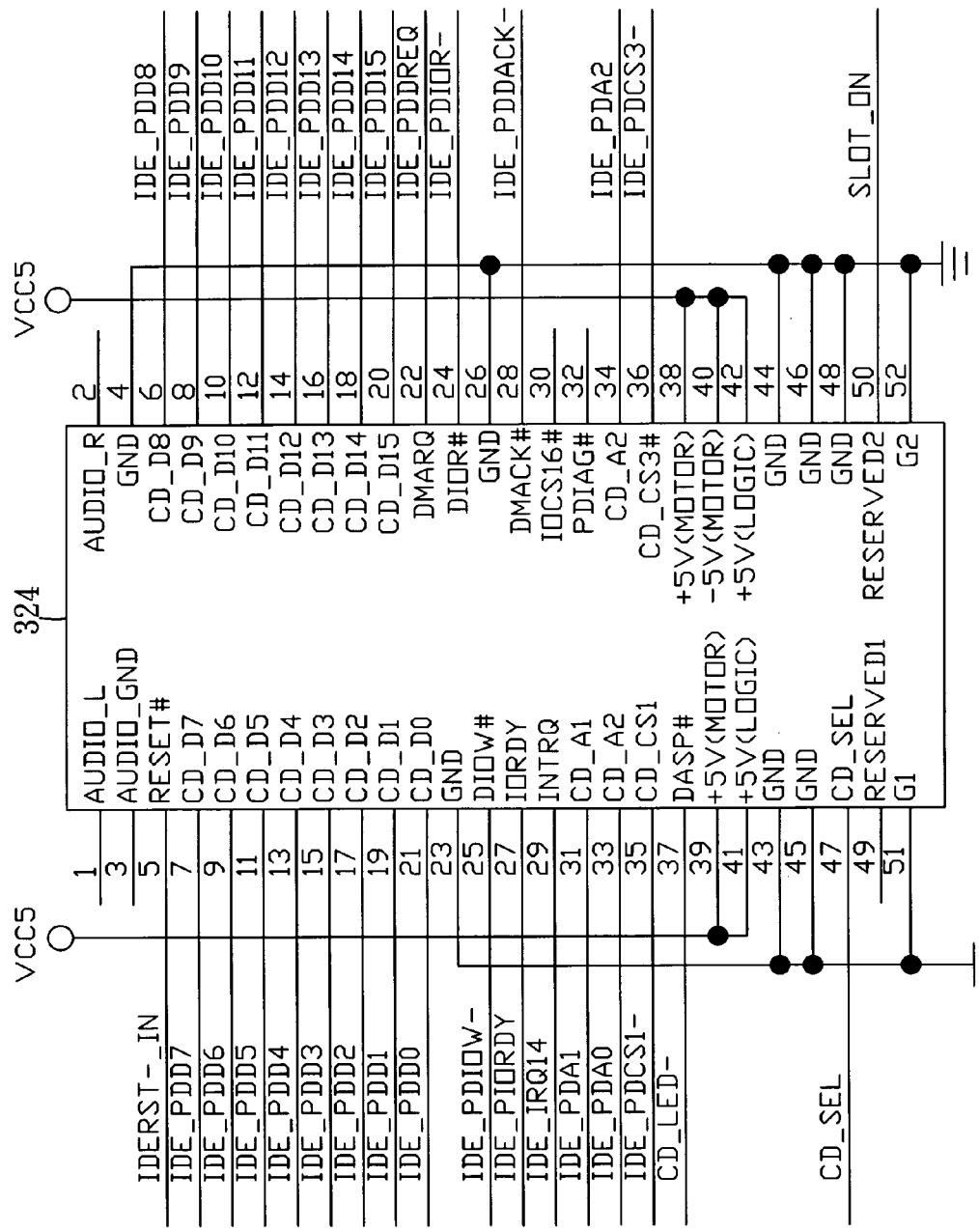
FIG. 7 is a layout diagram of an example of an optical disk drive connector of the preferred embodiment.
Figure 8:
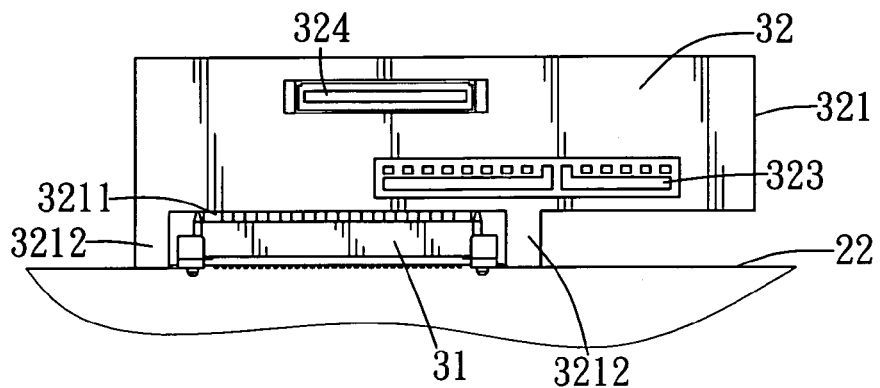
FIG. 8 is a fragmentary schematic view to illustrate connection of an adaptor board to the slot connector of the preferred embodiment.

In this embodiment, as shown in FIG. 6, the hard disk connector 323 is a SATA connector. As shown in FIG. 7, the optical disk drive connector 324 is an IDE connector. Furthermore, referring to FIG. 8, two support pieces 3212 extend downwardly from the bottom side of the board body 321, and are disposed respectively on two sides of the tab 3211. Each of the support pieces 3212 is spaced apart from the tab 3211 by a predetermined distance that matches the thickness of a housing of the slot connector 31 such that when the mating connector 322 of the adaptor board 32 mates with the slot connector 31, the two support pieces 3212 can assist in supporting and positioning of the adaptor board 32.

Figure 9:
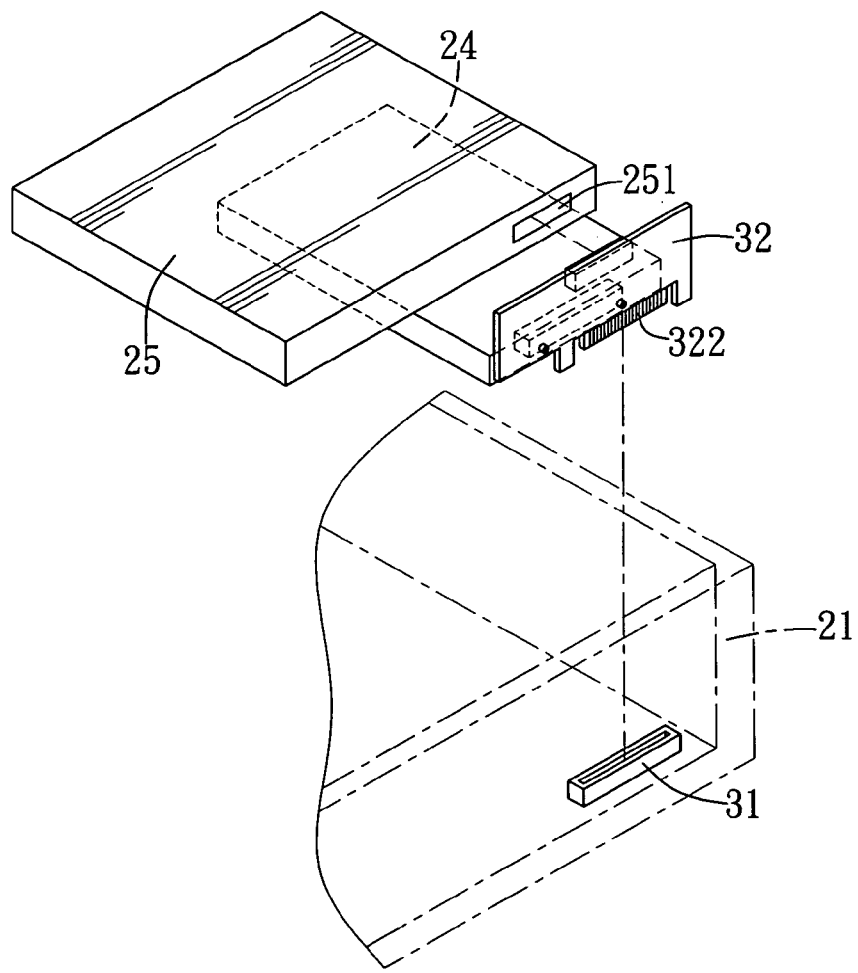
FIG. 9 is a fragmentary view to illustrate assembly of the preferred embodiment.

Thus, referring to FIG. 2, during assembly, it is merely necessary to have respective connectors 241, 251 of the hard disk 24 and the optical disk drive 25 mated with the hard disk connector 323 and the optical disk drive connector 324 on the adaptor board 32, respectively. Then, as shown in FIG. 9, the mating connector 322 of the adaptor board 32 is mated to the slot connector 31 to thereby electrically connect the hard disk 24 and the optical disk drive 25 to the motherboard 22, thereby facilitating easy assembly and maintenance.

Figure 10:
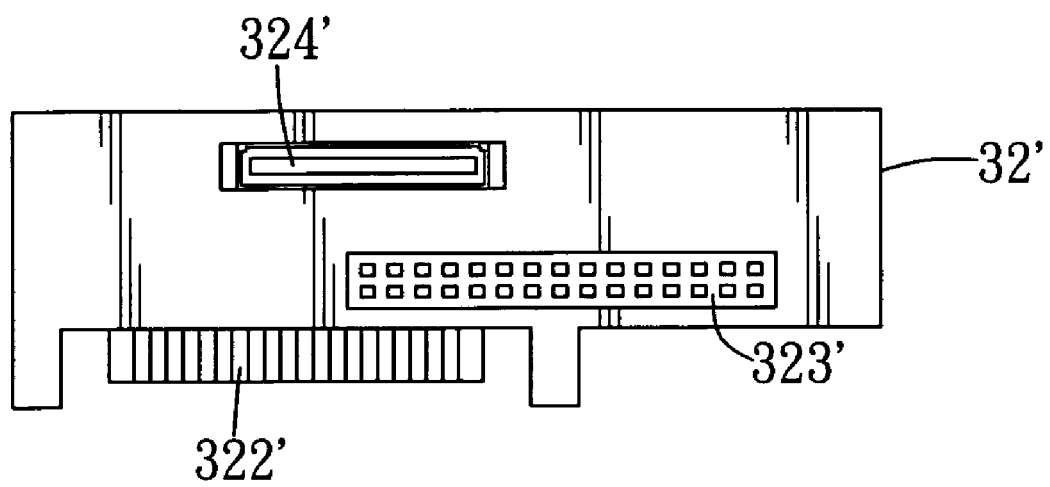
FIG. 10 is a schematic view to illustrate an alternative form of the adaptor board of the preferred embodiment.

Referring to FIG. 10 in combination with FIG. 3, it is noted that since some hard disks are of the IDE specification, the hard disk connector 323' of the adaptor board 32' can be an IDE (i.e., PATA) connector. The hard disk connector 323' is connected to IDE wiring of the mating connector 322' so that the hard disk connector 323' and the optical disk drive connector 324' share the same transmission line 2222 to the South Bridge 222. Thus, two types of adaptor boards 32, 32' having a SATA hard disk connector 323 and an IDE hard disk connector 323', respectively, can be pre-fabricated to allow manufacturers to select either the adaptor board 32 or 32' to match the specification of the hard disk 24, thereby facilitating assembly.

Given the foregoing, the computer device 2 having a modular transmission interface of the present invention allows the hard disk 24 and the optical disk drive 25 to be electrically connected to the motherboard 22 via the adaptor board 32, 32' so as to achieve easy assembly and maintenance. Furthermore, the above-illustrated preferred embodiment employs a single slot connector 31 that is responsible for signal transmission between the South Bridge 222 and the hard disk 24 and the optical disk drive 25, and that is also responsible for delivering the electric power required by the hard disk 24 and the optical disk drive 25. As a result, signal and power transmission between the motherboard 22 and each of the hard disk 24 and the optical disk drive 25 can be realized by a single insertion operation of the adaptor board 32, 32', thereby simplifying circuit connections and assembly operation. Besides, the space required for connecting transmission interfaces of the hard disk 24 and the optical disk drive 25 within the computer device 2 and on the motherboard 22 can be reduced effectively to conform to the trend toward miniaturization of the computer device 2.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A modular transmission interface which is adapted to be provided on a motherboard, the motherboard having a South Bridge and a power transmission port, said modular transmission interface comprising:

a slot connector adapted to be provided on the motherboard and adapted to be connected to the South Bridge and the power transmission port; and an adaptor board having a board body, a mating connector provided on said board body and connected detachably to said slot connector, a hard disk connector provided on said board body and connected to said mating connector, and an optical disk drive connector provided on said board body and connected to said mating connector.

2. The modular transmission interface according to claim 1, wherein said board body is a rectangular circuit board, and said mating connector is provided on a bottom side of said board body.

3. The modular transmission interface according to claim 2, wherein said board body has a tab extending downwardly from said bottom side and that matches said slot connector, said mating connector including a plurality of conductive pieces arranged in a row on a surface of said tab.

4. The modular transmission interface according to claim 3, wherein said board body further has support pieces that extend downwardly from said bottom side, and that are disposed respectively on two sides of said tab to match said slot connector.

5. The modular transmission interface according to claim 1, wherein said hard disk connector is a Serial Advanced Technology Attachment connector.

6. The modular transmission interface according to claim 1, wherein said hard disk connector is an Integrated Drive Electronics connector.

7. The modular transmission interface according to claim 1, wherein said optical disk drive connector is an Integrated Drive Electronics connector.

8. A computer device comprising:
- a motherboard having a South Bridge and a power transmission port;
- a hard disk;
- an optical disk drive; and
- a modular transmission interface having:
  - a slot connector provided on said motherboard and connected to said South Bridge and said power transmission port; and
  - an adaptor board having a board body, a mating connector provided on said board body and connected detachably to said slot connector, a hard disk connector provided on said board body and connected to said mating connector, and an optical disk drive connector provided on said board body and connected to said mating connector, said hard disk being connected detachably to said hard disk connector, said optical disk drive being connected detachably to said optical disk drive connector.

9. The computer device according to claim 8, wherein said board body is a rectangular circuit board, and said mating connector is provided on a bottom side of said board body.

10. The computer device according to claim 9, wherein said board body has a tab that extends downwardly from said bottom side and that matches said slot connector, said mating connector including a plurality of conductive pieces arranged in a row on a surface of said tab.

11. The computer device according to claim 10, wherein said board body further has support pieces that extend downwardly from said bottom side, and that are disposed respectively on two sides of said tab to match said slot connector.

12. The computer device according to claim 8, wherein said hard disk connector is a Serial Advanced Technology Attachment connector.

13. The computer device according to claim 8, wherein said hard disk connector is an Integrated Drive Electronics connector.

14. The computer device according to claim 8, wherein said optical disk drive connector is an Integrated Drive Electronics connector.

15. An adaptor board adapted to be connected detachably to a slot connector on a motherboard, the slot connector being connected to a South Bridge and a power transmission port on the motherboard, said adaptor board comprising:
- a board body;
- a mating connector provided on said board body and adapted to be connected detachably to the slot connector;
- a hard disk connector provided on said board body and connected to said mating connector; and
- an optical disk drive connector provided on said board body and connected to said mating connector.

16. The adaptor board according to claim 15, wherein said board body is a rectangular circuit board, and said mating connector is provided on a bottom side of said board body.

17. The adaptor board according to claim 16, wherein said board body has a tab that extends downwardly from said bottom side and that is adapted to match the slot connector, said mating connector having a plurality of conductive pieces arranged in a row on a surface of said tab.

18. The adaptor board according to claim 17, wherein said board body further has support pieces that extend downwardly from said bottom side, and that are disposed respectively on two sides of said tab so as to be adapted to match the slot connector.

19. The adaptor board according to claim 15, wherein said hard disk connector is a Serial Advanced Technology Attachment connector.

20. The adaptor board according to claim 15, wherein said hard disk connector is an Integrated Drive Electronics connector.

21. The adaptor board according to claim 15, wherein said optical disk drive connector is an Integrated Drive Electronics connector.

* * * * *